United States Patent
Shao et al.

(10) Patent No.: US 12,254,600 B2
(45) Date of Patent: Mar. 18, 2025

(54) JOINT IMAGING SYSTEM BASED ON UNMANNED AERIAL VEHICLE PLATFORM AND IMAGE ENHANCEMENT FUSION METHOD

(71) Applicant: CHINA UNIVERSITY OF MINING AND TECHNOLOGY, Xuzhou (CN)

(72) Inventors: Zhenlu Shao, Xuzhou (CN); Xiaoxing Zhong, Xuzhou (CN); Rong Deng, Xuzhou (CN); Tong Yang, Xuzhou (CN); Guangchen Qu, Xuzhou (CN); Huisong Zhang, Xuzhou (CN); Zhaolong Wang, Xuzhou (CN); Chentao Ye, Xuzhou (CN); Tao Zhou, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 18/735,669

(22) Filed: Jun. 6, 2024

(65) Prior Publication Data
US 2024/0412332 A1   Dec. 12, 2024

(30) Foreign Application Priority Data

Jun. 8, 2023 (CN) .......................... 202310676370.6

(51) Int. Cl.
*G06T 5/50* (2006.01)
*B64U 20/87* (2023.01)
(Continued)

(52) U.S. Cl.
CPC ................ *G06T 5/50* (2013.01); *B64U 20/87* (2023.01); *G02B 13/14* (2013.01); *G03B 15/006* (2013.01);
(Continued)

(58) Field of Classification Search
CPC .... G06T 5/50; G06T 7/80; G06T 7/74; G06T 7/337; G06T 5/80; G06T 3/40;
(Continued)

(56) References Cited

U.S. PATENT DOCUMENTS

2019/0212316 A1* 7/2019 Sutton ................ G01N 33/0098
2020/0143545 A1* 5/2020 Weng ......................... G06T 5/50
(Continued)

FOREIGN PATENT DOCUMENTS

CN    107976856 A    5/2018
CN    111080724 A    4/2020
(Continued)

OTHER PUBLICATIONS

Notification to Grant Patent for China Application No. 202310676370.6, mailed Apr. 23, 2024.
(Continued)

*Primary Examiner* — Mohamed A. Wasel
(74) *Attorney, Agent, or Firm* — Pilloff Passino & Cosenza LLP; Rachel Pilloff; Sean Passino

(57) ABSTRACT

A joint imaging system based on unmanned aerial vehicle platform and an image enhancement fusion method are provided. The system includes a flying unit as a load platform, a shutter control system for controlling the operation of a load camera, a posture control system for recording the movement track and POS data of the flying unit, an airborne image transmission system for communicating with ground equipment, and an onboard computing unit with an image processing module for receiving the output images and performing image processing and fusion.

6 Claims, 4 Drawing Sheets

(51) Int. Cl.
  *G02B 13/14* (2006.01)
  *G03B 15/00* (2021.01)
  *G06T 3/40* (2006.01)
  *G06T 5/80* (2024.01)
  *G06T 7/13* (2017.01)
  *G06T 7/33* (2017.01)
  *G06T 7/73* (2017.01)
  *G06T 7/80* (2017.01)
  *H04N 7/18* (2006.01)
  *H04N 23/11* (2023.01)
  *H04N 23/16* (2023.01)
  *B64U 101/30* (2023.01)

(52) U.S. Cl.
  CPC .................. *G06T 3/40* (2013.01); *G06T 5/80* (2024.01); *G06T 7/13* (2017.01); *G06T 7/337* (2017.01); *G06T 7/74* (2017.01); *G06T 7/80* (2017.01); *H04N 7/181* (2013.01); *H04N 23/11* (2023.01); *H04N 23/16* (2023.01); *B64U 2101/30* (2023.01); *G06T 2207/10024* (2013.01); *G06T 2207/10032* (2013.01); *G06T 2207/10048* (2013.01); *G06T 2207/20221* (2013.01); *G06T 2207/30244* (2013.01)

(58) Field of Classification Search
  CPC . G06T 2207/10024; G06T 2207/10032; G06T 2207/10048; G06T 2207/30244; H04N 23/16; H04N 23/11; G03B 15/006; B64U 2101/30
  See application file for complete search history.

(56) References Cited

U.S. PATENT DOCUMENTS

| | | | |
|---|---|---|---|
| 2020/0278696 A1* | 9/2020 | Miller | G05D 1/0669 |
| 2020/0301015 A1* | 9/2020 | Siddiqui | G01S 17/86 |
| 2021/0141378 A1* | 5/2021 | Zhou | G06T 7/246 |
| 2023/0267364 A1* | 8/2023 | Vidhi | F03D 17/007 |
| | | | 382/100 |

FOREIGN PATENT DOCUMENTS

| | | |
|---|---|---|
| CN | 112053392 A | 12/2020 |
| CN | 212290224 U | 1/2021 |
| CN | 113155176 A | 7/2021 |
| CN | 114897947 A | 8/2022 |
| KR | 200320715 A | 7/2003 |

OTHER PUBLICATIONS

First Search Report Patent for China Application No. 202310676370.6, dated Apr. 18, 2024.

* cited by examiner

JOINT IMAGING SYSTEM BASED ON UNMANNED AERIAL VEHICLE PLATFORM AND IMAGE ENHANCEMENT FUSION METHOD

CROSS-REFERENCE TO RELATED APPLICATIONS

This application claims priority to Chinese Patent Application No. 202310676370.6, filed on Jun. 8, 2023, the contents of which are hereby incorporated by reference.

TECHNICAL FIELD

The disclosure relates to the technical fields of surveying and mapping technology and image processing, and in particular to a joint imaging system based on unmanned aerial vehicle platform and an image enhancement fusion method.

BACKGROUND

Oblique photogrammetry is a high-tech developed in the field of surveying and mapping in recent years, which enables the truly reflection of the appearance, position, height and other attributes of ground objects. Different from the previous orthogonal photography, oblique photogrammetry involves multiple sensors equipped on the same aviation platform to synchronously collect image data from one vertical angle and four oblique angles, allowing efficient and rapid access to massive data information, providing authentic and reliable response to the objective situation on the ground, with wide application in the fields of urban digitalization, land and resources planning and others.

Optical sensor of a single type usually fails to fully characterize the target scene. Visible light images usually have rich texture details, but the perception of the target state is deficient. Thermal infrared sensors are capable of capturing the thermal radiation information of objects and image them, effectively highlighting high-temperature targets, but lack the description of the scene details. Accordingly, the dual-light camera formed by the combination of thermal infrared sensor and visible light sensor is a brand-new application platform in the field of computer vision. The dual-light camera is capable of obtaining enough color and texture information and at the same time perceive and describe the high-temperature target, which meets the requirements of computer vision applications such as semantic segmentation, target recognition and three-dimensional imaging. At present, oblique photogrammetry mainly uses visible light cameras for imaging, and the existing five-lens cameras are all visible light sensors. Therefore, when using an aviation platform to carry a single thermal infrared camera for oblique photogrammetry, it is necessary to arrange five routes to simulate five visual angles for imaging, which has the disadvantages of low efficiency and long time consumption.

In addition, with different lens and sensor manufacturing processes, the thermal infrared camera and visible camera have different imaging specifications, such as focal length, field of view angle and image resolution. Even if the two cameras are arranged on the same baseline and the optical axes are parallel to form a dual-light camera system, the spatial scales of the obtained visible light image and thermal infrared image are not consistent, and the image scale factor is not directly equal to the focal length ratio of the two cameras, which leads to the failure to effectively combine the temperature and color information of the thermal infrared image with the texture details information of the visible light image, resulting the low recognition of feature points in thermal infrared images, thus limiting the application of dual-light camera in three-dimensional modeling technology.

SUMMARY

Objectives of the disclosure: the technical problem to be solved by the present disclosure is to provide a joint imaging system based on unmanned aerial vehicle platform and an image enhancement fusion method, so as to realize efficient and rapid collection of visible light images and thermal infrared images, and enable effective spatial registration and pixel-level image fusion to obtain thermal infrared images with texture details.

The joint imaging system includes a flying unit, an airborne computing unit, a shutter control unit, a posture control unit, an airborne image transmission unit, a ten-lens imaging unit and a load pan-tilt interface;

where the flying unit is used for carrying load equipment to fly according to a predetermined route;

the shutter control unit is used for controlling shooting parameters of a load camera;

the airborne image transmission unit is used for transmitting thermal infrared images, visible light images and thermal infrared enhanced images after image enhancement and fusion to ground equipment in a wireless way;

the posture control unit includes an inertial measurement unit IMU module and a global positioning system (GPS) module, where the inertial measurement unit IMU module is used for measuring and recording posture parameters of the flying unit and positions of the load camera, and the global positioning system (GPS) module is used for measuring and recording an accurate geographic information position of the flying unit;

the airborne computing unit includes an image processing module, and the image processing module is used for receiving and storing image data of the load camera and the positions and postures of the load camera recorded by the posture control unit, and processing and fusing images in real time;

the ten-lens imaging unit is connected with the shutter control unit, the posture control unit and the airborne image transmission unit through the load pan-tilt interface, and the ten-lens imaging unit is used for collecting image data of color imaging and thermal infrared imaging of a target object, and transmitting the image data to the airborne computing unit.

The ten-lens imaging unit includes five visible light lenses with same specifications and five thermal infrared lenses with same specifications.

The visible light lenses are RGB color cameras and the thermal infrared lenses are uncooled medium-wave infrared camera.

One visible light lens and one thermal infrared lens form a lens group, totally five lens groups are formed, and a distance between the visible light lens and the thermal infrared lens in each lens group is equal;

among them, one lens group is arranged at a center position of an unmanned aerial vehicle, and other four lens groups are arranged in a cross layout, respectively arranged at four corner positions of the unmanned aerial vehicle equidistant from the center position;

a lens in the center position of the unmanned aerial vehicle is arranged vertically downward, and lenses in the four corner positions are inclined to a center at a same angle, and an inclination angle is 30 degrees (°)-50°.

The visible light lens and the thermal infrared lens are all overlapped in terms of imaging ranges in five visual angles of down view, forward view, back view, left view and right view, and an overlapping rate of the imaging ranges in the five visual angles is over 60%, and the imaging ranges of the thermal infrared lenses are included in the imaging ranges of the visible light lenses.

The five lens groups are arranged adjacent to each other at the center position and the four corner positions of the unmanned aerial vehicle, and adjacent visible light lenses and the thermal infrared lenses are arranged in a parallel optical axis structure with a same inclination direction and imaging visual angles.

Optionally, the present disclosure provides an image enhancement fusion method based on an unmanned aerial vehicle platform, including following steps:

step 1, collecting thermal infrared images and visible light images of a same object in a same time domain and a same space domain by the ten-lens imaging unit;

step 2, performing monocular correction on the visible light lens and the thermal infrared lens respectively: inputting an internal parameter matrix and a distortion coefficient of the visible light lens and the thermal infrared lens into the image processing module respectively, and correcting radial and tangential distortion of the visible light lens and the thermal infrared lens according to following formulas:

$$Z_C \begin{bmatrix} u \\ v \\ 1 \end{bmatrix} = \begin{pmatrix} f_x & 0 & u_0 \\ 0 & f_y & v_0 \\ 0 & 0 & 1 \end{pmatrix} * \begin{pmatrix} R & T \\ 0^T & 1 \end{pmatrix} \begin{bmatrix} X_W \\ Y_W \\ Z_W \\ 1 \end{bmatrix} \underline{\underline{def}} KCP_W$$

$$r^2 = x^2 + y^2$$

$$\begin{cases} x_{distortion} = x(1 + k_1 r^2 + k_2 r^4 + k_3 r^6) + 2p_1 xy + p_2(r^2 + 2x^2) \\ y_{distortion} = y(1 + k_1 r^2 + k_2 r^4 + k_3 r^6) + 2p_2 xy + p_1(r^2 + 2y^2) \end{cases},$$

where $f_x$, $f_y$, $u_0$ and $v_0$ are internal parameter coefficients; R is an external parameter rotation matrix; T is an external parameter translation vector; K is an internal parameter matrix; $Z_C$ is a Z-axis coordinate of a calibration point in a camera coordinate system; C is a spatial transformation matrix from a world coordinate system to the camera coordinate system; u and v respectively represent an abscissa and an ordinate of the calibration point in a pixel coordinate system; x and y are an X-axis coordinate and a Y-axis coordinate of the calibration point on a normalized plane of a camera, respectively; $Cs_W$, $Y_W$ and $Z_W$ respectively represent an X-axis coordinate, a Y-axis coordinate and a Z-axis coordinate of the calibration point in the world coordinate system; r is a polar coordinate form of the calibration point in the normalized plane; $k_1$, $k_2$, $k_3$, $p_1$, and $p_2$ are distortion coefficients; $P_W$ is a coordinate of the calibration point in the world coordinate system; and $x_{distortion}$, $y_{distortion}$ are distortion values of the camera in a direction of x, y; def represents an equation of definition;

step 3, respectively identifying a same feature point in the visible light images and the thermal infrared images, measuring coordinate values of the feature point in a visible light pixel coordinate system and a thermal infrared pixel coordinate system; according to solved transformation matrices K and C of the visible light pixel coordinate system, the thermal infrared pixel coordinate system and the world coordinate system, performing linear transformation to obtain a rotation matrix and a translation matrix of pixel coordinates of the visible light images and pixel coordinates of the thermal infrared images, so as to complete a spatial geometric registration; where a transformation matrix between a visible light camera and a thermal infrared camera satisfies a following formula:

$$C_I^{-1} \begin{pmatrix} f_{x\_I}^{-1} & 0 & u_I f_{x\_I}^{-1} \\ 0 & f_{y\_I}^{-1} & v_I f_{y\_I}^{-1} \\ 0 & 0 & 1 \end{pmatrix} P_{pixel\_I} = C_V^{-1} \begin{pmatrix} f_{x\_V}^{-1} & 0 & u_V f_{x\_V}^{-1} \\ 0 & f_{y\_V}^{-1} & v_V f_{y\_V}^{-1} \\ 0 & 0 & 1 \end{pmatrix} P_{pixel\_V},$$

where $C_I^{-1}$ and $C_V^{-1}$ are an inverse matrix of the internal parameter matrix of the thermal infrared camera and an inverse matrix of the internal parameter matrix of the visible light camera respectively, and $P_{pixel\_I}$ and $P_{pixel\_V}$ are an abscissa and an ordinate of the calibration point in the thermal infrared pixel coordinate system and visible light pixel coordinate system respectively; $f_{x\_I}^{-1}$ and $f_{y\_I}^{-1}$ are reciprocals of the internal parameter coefficients of the thermal infrared camera; $f_{x\_V}^{-1}$ and $f_{y\_V}^{-1}$ are reciprocals of the internal parameter coefficients of the visible light camera; $u_I$ and $v_I$ are coordinates of the thermal infrared camera in the pixel coordinate system; and $u_V$ and $v_V$ are coordinates of visible light in the pixel coordinate system;

calculating difference values between abscissas and ordinates of pixels of two adjacent calibration points in the visible light images and the thermal infrared images respectively, where the image scale factor $\sigma_{Scalefactor}$ is a ratio of a distance between the two adjacent calibration points in visible light images and a distance between the two adjacent calibration points in thermal infrared images;

$$\sigma_{Scalefactor} = \frac{x_{infrared}^n - x_{infrared}^{n-1}}{x_{visible}^n - x_{visible}^{n-1}},$$

where n is a number of checkerboard calibration points; $X_{infrared}^n$ is a coordinate value of the pixel coordinate system of an n-th calibration point in the thermal infrared camera; $X_{visible}^n$ is a coordinate value of the pixel coordinate system of the n-th calibration point in the visible light camera;

offset vectors $x_{shift}$, $y_{shift}$ are obtained by subtracting a column vector in the visible light pixel coordinate system from a column vector in the thermal infrared pixel coordinate system of a same calibration point:

$$\begin{bmatrix} x_{shift} \\ y_{shift} \end{bmatrix} = \begin{bmatrix} x_{visible}^n \\ y_{visible}^n \end{bmatrix} - \begin{bmatrix} x_{infrared}^n \\ y_{infrared}^n \end{bmatrix},$$

step 4, down-sampling the visible light images, unifying image parameters and field of view of the thermal infrared images and the visible light images: unifying resolution of the images, unifying the imaging ranges to be thermal infrared image imaging ranges and unifying spatial scale to be scale parameters of the thermal infrared images, and taking the thermal infrared images as interest areas or target areas, and according to a solved image scale factor $\sigma_{Scalefactor}$ and offset vector $$\begin{bmatrix} x_{shift} \\ y_{shift} \end{bmatrix},$$

correcting and matching the visible light images, and reserving the interest areas or the target areas; multiplying a visible light image V(x, y) by the image scale factor, and scaling to a spatial scale L(u, v) of the thermal infrared images, and realizing a spatial information registration of the thermal infrared images and the visible light images by combining the offset vector:

$$L(u, v) = V(x, y) * \sigma_{Scalefactor};$$

step 5, performing a convolution calculation on down-sampled visible light images by using an edge detection operator, and performing an edge detection on the down-sampled visible light images, extracting edge skeleton maps of the visible light images and performing binarization as an edge feature detail matrix; and step 6, adopting a pixel-level fusion method, converting the thermal infrared images into a form of numerical matrix by using an image processing function, and adding the numerical matrix of the thermal infrared images and an edge feature binary image matrix to improve a number of feature points and recognition capability of the thermal infrared images.

The method is built into the airborne computing unit as the image processing module, and received thermal infrared images and visible light images in the same time domain and space domain are processed and fused in real time.

In the step 2, monocular calibration is performed on the visible light lens and the thermal infrared lens to obtain the internal parameter matrix K and the transformation matrix C between the camera coordinate system and the world coordinate system.

The beneficial effect of that disclosure are as follows.

According to the system, a ten-lens dual-light imaging unit is mounted on an aviation platform, so that a ground target is jointly imaged by visible light and thermal infrared, and RGB color information and thermal radiation information are synchronously captured, so that thermal infrared oblique photogrammetry with high efficiency, low cost and low time consumption is realized, the workload of data collection is greatly reduced, and the application requirements of urban thermal environment, mine environment monitoring and other scenes are met. In addition, the image enhancement fusion method provided by the disclosure is capable of effectively fusing the texture feature information of the visible light images and the temperature color information of the thermal infrared images to obtain thermal infrared pseudo-color images with texture features, which may improve the number and recognizability of feature points in the thermal infrared images, and further improve the spatial coordinate accuracy and texture fineness of the three-dimensional temperature field model.

BRIEF DESCRIPTION OF THE DRAWINGS

The advantages of the above and/or other aspects of the present disclosure will become clearer when the present disclosure is further described in detail with reference to the attached drawings and specific embodiments.

DETAILED DESCRIPTION OF THE EMBODIMENTS

Figure 1:
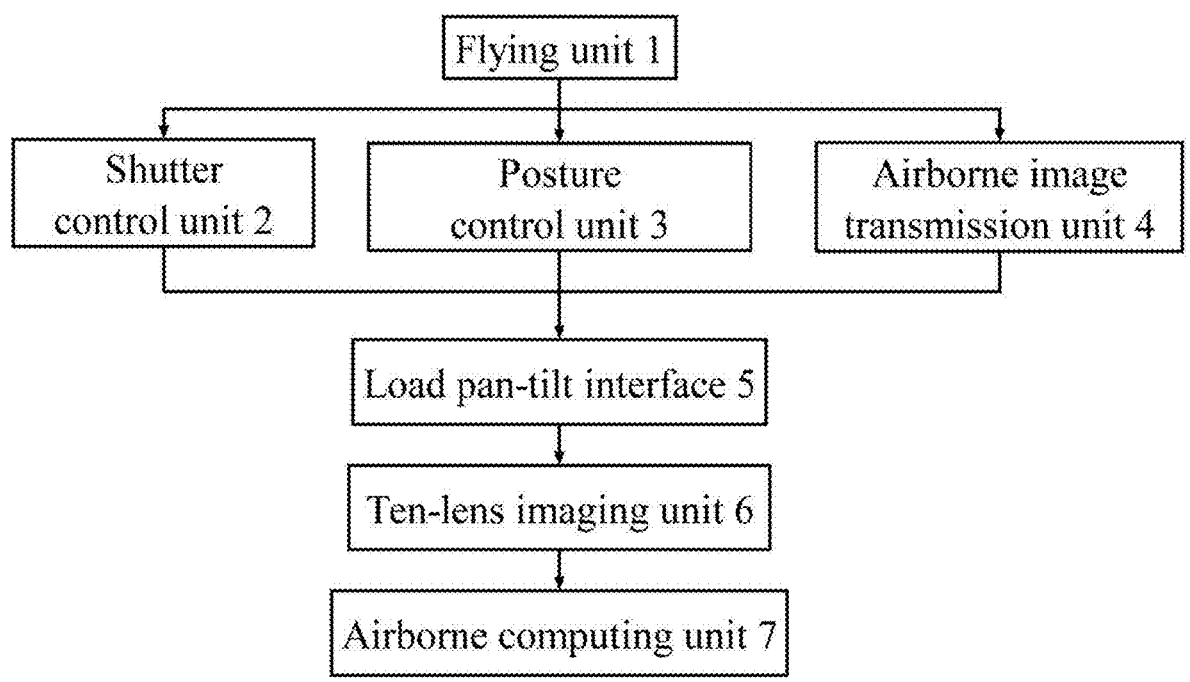
FIG. 1 is a schematic diagram of the system structure provided by the present disclosure.

The disclosure adopts a joint imaging system based on an unmanned aerial vehicle platform, as shown in FIG. 1, which includes a flying unit 1, a shutter control unit 2, a posture control unit 3, an airborne image transmission unit 4, a load pan-tilt interface 5, a ten-lens imaging unit 6 and an airborne computing unit 7.

The flying unit 1 is used for carrying load equipment to fly according to a predetermined route;

the shutter control unit 2 is used for controlling shooting parameters such as shutter time and exposure time of the load camera;

the posture control unit 3 includes an IMU module and a GPS module, where the IMU module is used for measuring and recording the posture parameters of the flying unit and the position of the load camera, and the GPS module is used for measuring and recording the accurate geographic information position of the flying unit;

the airborne image transmission unit 4 is used for transmitting thermal infrared images and visible light images to ground equipment in a wireless transmission mode;

the airborne computing unit 7 includes an image processing module, which is used for receiving the image data of the load camera and the camera position and posture recorded by the posture control unit, and processing and fusing the received images in real time;

the ten-lens imaging unit 6 is connected with the shutter control unit 2, the posture control unit 3 and the airborne computing unit 7 through the load pan-tilt interface 5. The ten-lens imaging unit 6 is used for color imaging and thermal infrared imaging of the target object, collecting image data and transmitting the image data to the airborne computing unit 7.

In order to further illustrate the above-mentioned system of the present disclosure, it will be explained by the following specific embodiments.

Figure 2:
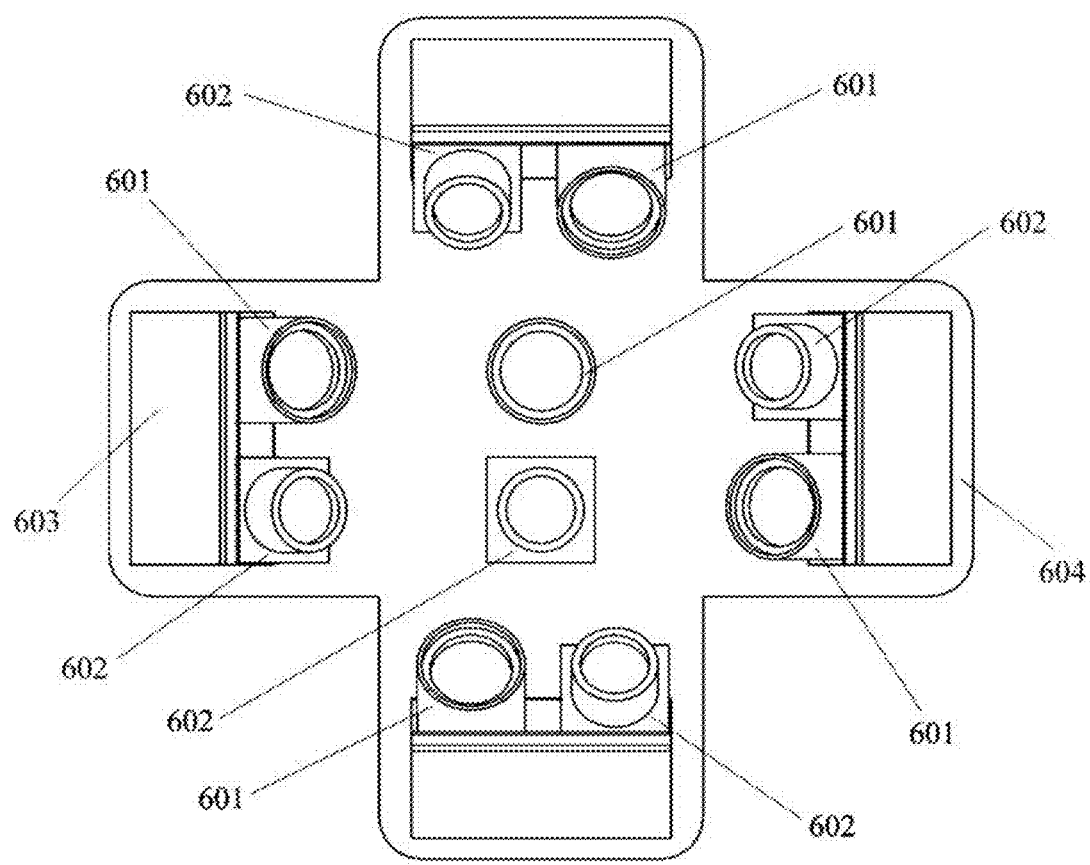
FIG. 2 is a ten-lens thermal infrared and visible light imaging unit provided by the present disclosure.

As shown in FIG. 2, the structure of the ten-lens imaging unit 6 includes visible light lenses 601 and thermal infrared lenses 602.

The ten-lens imaging unit 6 includes five visible light lenses with the same specifications and five thermal infrared lenses with the same specifications.

The visible light lenses are RGB color cameras and the thermal infrared lenses are uncooled medium-wave infrared cameras.

The visible light lens and the thermal infrared lens are arranged in an equidistant cross layout, and are arranged at the center position and four corners equidistant from the center; the lens at the center position is arranged vertically downwards, and the lenses at the four corners are inclined to the center at the same angle, and the inclination angles are between 30 degrees and 50 degrees.

The imaging ranges of the visible light lens and the thermal infrared lens overlap in five directions, and the overlapping rate of the imaging ranges of the visible light lens and the thermal infrared lens in five visual angles is above 60%, and the imaging ranges of the thermal infrared lens are included in the imaging ranges of the visible light lens.

Figure 3:
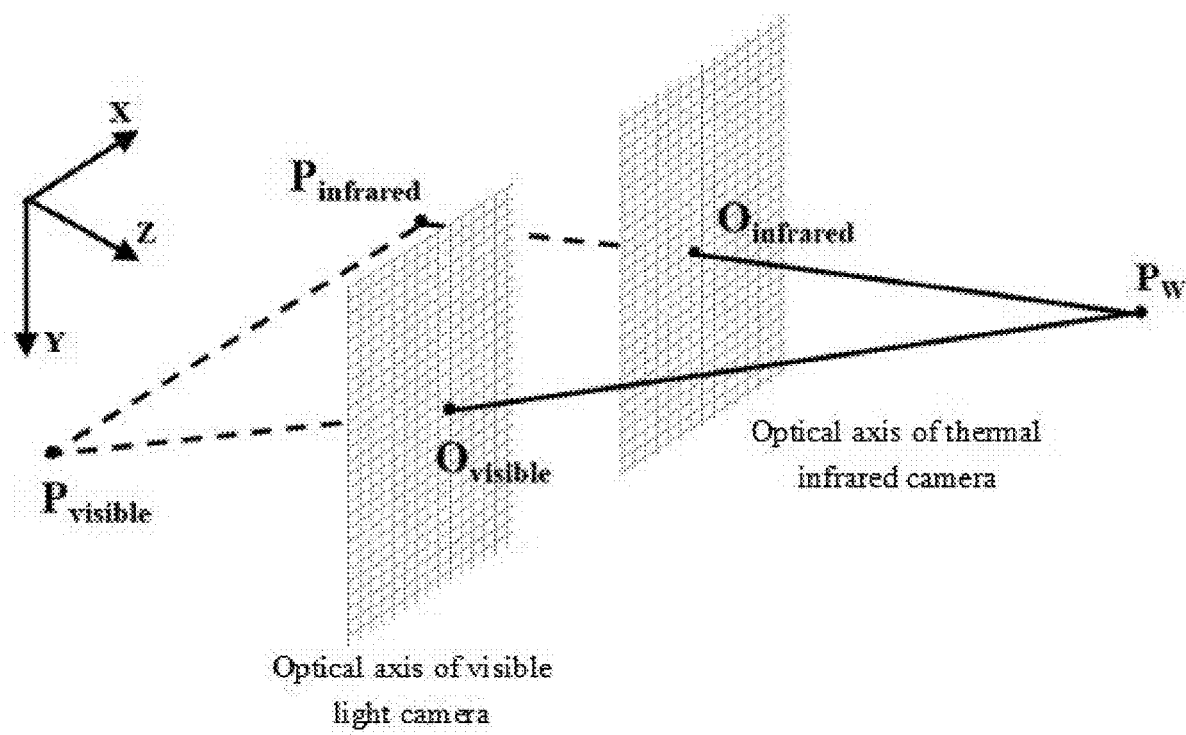
FIG. 3 is a schematic diagram of a thermal infrared camera and a visible light camera arranged parallel to the optical axis.

The visible light lens and the thermal infrared lens are adjacently arranged at the center position and four corners respectively, and the adjacent visible light lenses and the thermal infrared lens have the same inclination direction and imaging visual angle, and are arranged in a parallel optical axis structure, as shown in FIG. 3.

Figure 4:
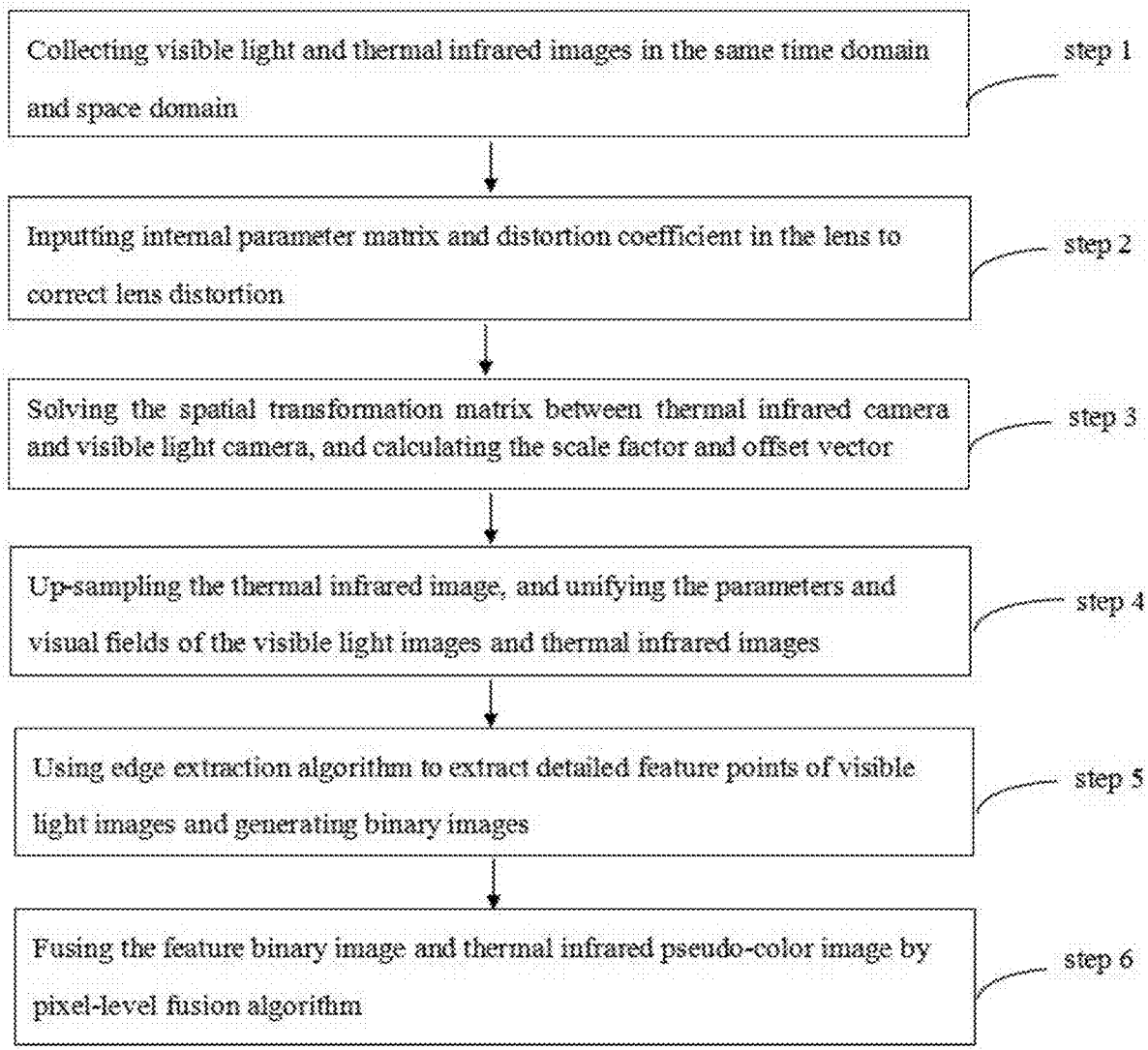
FIG. 4 is a flowchart of an image enhancement fusion method provided by the present disclosure.

As shown in FIG. 4, the method for realizing image enhancement fusion by using the system include the following steps.

Step 1, collecting thermal infrared images and visible light images of the same object in the same time domain and the same space domain.

Step 2, inputting the internal parameter matrix and distortion coefficient of the thermal infrared camera and the visible light camera into the image processing module respectively, and correcting the radial and lateral distortion of the thermal infrared camera and the visible light camera according to the following formulas:

$$Zc \begin{bmatrix} u \\ v \\ 1 \end{bmatrix} = \begin{pmatrix} f_x & 0 & u_o \\ 0 & f_y & v_o \\ 0 & 0 & 1 \end{pmatrix} * \begin{pmatrix} R & T \\ 0^T & 1 \end{pmatrix} \begin{bmatrix} X_W \\ Y_W \\ Z_W \\ 1 \end{bmatrix} \overset{def}{=} KCP_W$$

$$r^2 = x^2 + y^2$$

$$\begin{cases} x_{distortion} = x(1 + k_1 r^2 + k_2 r^4 + k_3 r^6) + 2 p_1 xy + p_2 (r^2 + 2x^2) \\ y_{distortion} = y(1 + k_1 r^2 + k_2 r^4 + k_3 r^6) + 2 p_2 xy + p_1 (r^2 + 2y^2) \end{cases},$$

where: $f_x$, $f_y$, $u_0$ and $v_0$ are internal parameter coefficients; R is an external parameter rotation matrix; T is an external parameter translation vector; K is an internal parameter matrix; $Z_C$ is a Z-axis coordinate of a calibration point in a camera coordinate system; C is a spatial transformation matrix from a world coordinate system to the camera coordinate system; $X_W$, $Y_W$ and $Z_W$ respectively represent an X-axis coordinate, a Y-axis coordinate and a Z-axis coordinate of the calibration point in the world coordinate system; u and v respectively represent an abscissa and an ordinate of the calibration point in a pixel coordinate system; x and y are an X-axis coordinate and a Y-axis coordinate of the calibration point on a normalized plane of a camera, respectively; r is a polar coordinate form of the calibration point in the normalized plane; $k_1$, $k_2$, $k_3$, $p_1$, and $p_2$ are distortion coefficients; and $x_{distortion}$, $y_{distortion}$ are distortion values of the camera in a direction of x, y.

Step 3, respectively identifying the same feature point in the visible light image and the thermal infrared image, measuring the coordinate values of the point in the visible light pixel coordinate system and the thermal infrared pixel coordinate system, and according to the solved transformation matrix between the visible light $P_{pixel\_V}$ and the thermal infrared pixel coordinate system $P_{pixel\_I}$ and the world coordinate system, and according to the formula:

$$C_I^{-1} \begin{pmatrix} f_{x\_I}^{-1} & 0 & u_I f_{x\_I}^{-1} \\ 0 & f_{y\_I}^{-1} & v_I f_{y\_I}^{-1} \\ 0 & 0 & 1 \end{pmatrix} P_{pixel\_I} = C_V^{-1} \begin{pmatrix} f_{x\_V}^{-1} & 0 & u_V f_{x\_V}^{-1} \\ 0 & f_{y\_V}^{-1} & v_V f_{y\_V}^{-1} \\ 0 & 0 & 1 \end{pmatrix} P_{pixel\_V},$$

where: $C_I^{-1}$ and $C_V^{-1}$ are an inverse matrix of the internal parameter matrix of the thermal infrared camera and an inverse matrix of the internal parameter matrix of the visible light camera respectively, and $P_{pixel\_I}$ and $P_{pixel\_V}$ are an abscissa and an ordinate of the calibration point in the pixel coordinate system; $f_{x\_I}^{-1}$ and $f_{y\_I}^{-1}$ are reciprocals of the internal parameter coefficients of the thermal infrared camera; $f_{x\_V}^{-1}$ and $f_{y\_V}^{-1}$ are reciprocals of the internal parameter coefficients of the visible light camera; $u_I$ and $v_I$ are coordinates of the thermal infrared camera in the pixel coordinate system; and $u_V$ and $v_V$ are coordinates of visible light in the pixel coordinate system.

The rotation matrix and translation matrix of pixel coordinates of visible light images and thermal infrared images are capable of being obtained by linear transformation, and the spatial geometric registration is completed.

The difference values between abscissas and ordinates of pixels of two adjacent calibration points in the visible light images and the thermal infrared images are calculated respectively, where the image scale factor σ is a ratio of a distance between the two adjacent calibration points in visible light images and a distance between the two adjacent calibration points in thermal infrared images;

$$\sigma_{Scalefactor} = \frac{X_{infrared}^n - X_{infrared}^{n-1}}{X_{visible}^n - X_{visible}^{n-1}},$$

where n is the number of checkerboard calibration points; the offset vector is the column vector of the same calibration point in the visible light pixel coordinate system and the column vector in the thermal infrared pixel coordinate system of a same calibration point:

$$\begin{bmatrix} x_{shift} \\ y_{shift} \end{bmatrix} = \begin{bmatrix} x_{visible}^n \\ y_{visible}^n \end{bmatrix} - \begin{bmatrix} x_{infrared}^n \\ y_{infrared}^n \end{bmatrix}$$

Spatial information registration of thermal infrared images and visible light images is realized by combining offset vector.

Step 4, down-sampling the visible light images, unifying imaging specifications and imaging ranges of the thermal infrared images and the visible light images: unifying resolution of the images, unifying the imaging ranges to be thermal infrared image imaging ranges and unifying spatial scale to be scale parameters of the thermal infrared images, taking the imaging ranges of the thermal infrared images as the interest areas, multiplying the visible light image V(x, y) by the image scale factor to scale to the spatial scale L(u, v) of the thermal infrared image, and combining with the offset vector to realize the spatial information registration of the thermal infrared images and the visible light images:

$$L(u, v) = V(x, y) * \sigma_{Scalefactor};$$

according to the image scale factor and offset vector, the visible light images are corrected, matched and the interest areas are reserved by using the image processing function.

Step 5, using edge detection operators such as Canny operator and Sabel operator to detect the edge of the down-sampled visible light images, and the edge skeleton maps of the visible light images are extracted and binarized.

Step 6, adding the thermal infrared pseudo-color image matrix and the edge feature binary image matrix by adopting a pixel-level fusion method to obtain thermal infrared images with enhanced texture details, thereby improving the number of feature points of the thermal infrared images and the recognition capability.

Embodiment

The present disclosure will be further described in detail with an embodiment.

(1) The unmanned aerial vehicle is equipped with a ten-lens joint imaging system to image the target, and a group of thermal infrared images and visible light images are obtained, where the thermal infrared image resolution is 640×512, the focal length is 25 mm, the visible light image resolution is 4000×3000, and the focal length is 8 mm.

(2) By extracting the coordinate values of two same calibration points in the thermal infrared image and the visible light image in the respective pixel coordinate systems, the image scale factor $\sigma_{scalefactor}=0.34$ and the offset vector $$\begin{bmatrix} x_{shift} \\ y_{shift} \end{bmatrix} = \begin{bmatrix} 372 \\ 261 \end{bmatrix}$$

are calculated.

(3) Taking the imaging ranges of the thermal infrared images as the interest areas, the visible light images are down-sampled to the scale of the thermal infrared images to obtain the down-sampled visible light images with the image resolution of 640×512, and the thermal infrared images are moved into the down-sampled visible light images according to the offset vector to realize spatial registration.

(4) Edge detection is carried out by gradient descent method, and the detailed feature information of the down-sampled visible light image is extracted and binarized to obtain a binary image of texture feature information.

(5) Using the image fusion method based on pixel level, the binary image of texture feature information is fused with the thermal infrared images, and finally the thermal infrared images with texture details are obtained.

The disclosure provides a joint imaging system based on an unmanned aerial vehicle platform and an image enhancement fusion method. There are many ways and means to realize the technical scheme. The above is only the preferred embodiment of the disclosure. It should be pointed out that for ordinary technicians in the technical field, several improvements and retouching can be made without departing from the principle of the disclosure, and these improvements and retouching should also be regarded as the protection scope of the disclosure. All components that are not clear in this embodiment can be realized by existing technology.

What is claimed is:

1. An image enhancement fusion method based on an unmanned aerial vehicle platform, wherein the method is realized based on a joint imaging system of the unmanned aerial vehicle platform, and the system comprises a flying unit, an airborne computing unit, a shutter control unit, a posture control unit, an airborne image transmission unit, a ten-lens imaging unit and a load pan-tilt interface;
wherein the flying unit is used for carrying load equipment to fly according to a predetermined route;
the shutter control unit is used for controlling shooting parameters of a load camera;
the airborne image transmission unit is used for transmitting thermal infrared images, visible light images and thermal infrared enhanced images after image enhancement and fusion to ground equipment in a wireless way;
the posture control unit comprises an inertial measurement unit IMU module and a global positioning system GPS module, wherein the inertial measurement unit IMU module is used for measuring and recording posture parameters of the flying unit and positions of the load camera, and the global positioning system GPS module is used for measuring and recording an accurate geographic information position of the flying unit;
the airborne computing unit comprises an image processing module, and the image processing module is used for receiving and storing image data of the load camera and the positions and postures of the load camera recorded by the posture control unit, and processing and fusing images in real time;
the ten-lens imaging unit is connected with the shutter control unit, the posture control unit and the airborne image transmission unit through the load pan-tilt interface, and the ten-lens imaging unit is used for collecting image data of color imaging and thermal infrared imaging of a target object, and transmitting the image data to the airborne computing unit;
one visible light lens and one thermal infrared lens form a lens group, totally five lens groups are formed, and a distance between the visible light lens and the thermal infrared lens in each lens group is equal;
wherein one lens group is arranged at a center position of an unmanned aerial vehicle, and the other four lens groups are arranged in a cross layout, respectively arranged at four corner positions of the unmanned aerial vehicle equidistant from the center position;
a lens in the center position of the unmanned aerial vehicle is arranged vertically downward, and the lenses in the four corner positions are inclined to a center at a same angle, and an inclination angle is 30°-50°;
the visible light lens and the thermal infrared lens are all overlapped in terms of imaging ranges in five visual angles of down view, forward view, back view, left view and right view, and an overlapping rate of the imaging ranges in the five visual angles is over 60%, and the imaging ranges of the thermal infrared lenses are comprised in the imaging ranges of the visible light lenses;
the method comprises following steps:
step 1, collecting thermal infrared images and visible light images of a same object in a same time domain and a same space domain by the ten-lens imaging unit;
step 2, performing monocular correction on the visible light lens and the thermal infrared lens respectively: inputting an internal parameter matrix and a distortion coefficient of the visible light lens and the thermal infrared lens into the image processing module respectively, and correcting radial and tangential distortion of the visible light lens and the thermal infrared lens according to following formulas:

$$Zc\begin{bmatrix}u\\v\\1\end{bmatrix}=\begin{pmatrix}f_x & 0 & u_o\\0 & f_y & v_o\\0 & 0 & 1\end{pmatrix}*\begin{pmatrix}R & T\\0^T & 1\end{pmatrix}\begin{bmatrix}X_W\\Y_W\\Z_W\\1\end{bmatrix}\underset{=}{def}KCP_W$$

$$r^2 = x^2 + y^2$$

$$\begin{cases}x_{distortion} = x(1+k_1r^2+k_2r^4+k_3r^6)+2p_1xy+p_2(r^2+2x^2)\\y_{distortion} = y(1+k_1r^2+k_2r^4+k_3r^6)+2p_2xy+p_1(r^2+2y^2)\end{cases},$$

wherein $f_x$, $f_y$, $u_0$ and $v_0$ are internal parameter coefficients; R is an external parameter rotation matrix; T is an external parameter translation vector; K is an internal parameter matrix; $Z_C$ is a Z-axis coordinate of a calibration point in a camera coordinate system; C is a spatial transformation matrix from a world coordinate system to the camera coordinate system; u and v respectively represent an abscissa and an ordinate of the calibration point in a pixel coordinate system; x and y are an X-axis coordinate and an Y-axis coordinate of the calibration point on a normalized plane of a camera, respectively; $X_W$, $Y_W$ and $Z_W$ respectively represent an X-axis coordinate, a Y-axis coordinate and a Z-axis coordinate of the calibration point in the world coordinate system; r is a polar coordinate form of the calibration point in the normalized plane; $k_1$, $k_2$, $k_3$, $p_1$, and $p_2$ are distortion coefficients; $P_W$ is a coordinate of the calibration point in the world coordinate system; and $x_{distortion}$, $y_{distortion}$ are distortion values of the camera in directions of x, y; def represents an equation of definition;

step 3, respectively identifying a same feature point in the visible light images and the thermal infrared images, measuring coordinate values of the feature point in a visible light pixel coordinate system and a thermal infrared pixel coordinate system, according to solved transformation matrices K and C of the visible light pixel coordinate system, the thermal infrared pixel coordinate system and the world coordinate system, performing linear transformation to obtain a rotation matrix and a translation matrix of pixel coordinates of the visible light images and pixel coordinates of the thermal infrared images, so as to complete a spatial geometric registration; wherein a transformation matrix between a visible light camera and a thermal infrared camera satisfies a following formula:

$$C_I^{-1}\begin{pmatrix}f_{x\_I}^{-1} & 0 & u_If_{x\_I}^{-1}\\0 & f_{y\_I}^{-1} & v_If_{y\_I}^{-1}\\0 & 0 & 1\end{pmatrix}P_{pixel\_I}=C_V^{-1}\begin{pmatrix}f_{x\_V}^{-1} & 0 & u_Vf_{x\_V}^{-1}\\0 & f_{y\_V}^{-1} & v_Vf_{y\_V}^{-1}\\0 & 0 & 1\end{pmatrix}P_{pixel\_V},$$

wherein $C_I^{-1}$ and $C_V^{-1}$ are an inverse matrix of the internal parameter matrix of the thermal infrared camera and an inverse matrix of the internal parameter matrix of the visible light camera respectively, and $P_{pixel\_I}$ and $P_{pixel\_V}$ are an abscissa and an ordinate of the calibration point in the thermal infrared pixel coordinate system and the visible light pixel coordinate system respectively; $f_{x\_I}^{-1}$ and $f_{y\_I}^{-1}$ are reciprocals of the internal parameter coefficients of the thermal infrared camera; $f_{x\_V}^{-1}$ and $f_{y\_V}^{-1}$ are reciprocals of the internal parameter coefficients of the visible light camera; $u_I$ and $v_I$ are coordinates of the thermal infrared camera in the pixel coordinate system; and $u_V$ and $v_V$ are coordinates of visible light in the pixel coordinate system;

calculating difference values between abscissas and ordinates of pixels of two adjacent calibration points in the visible light images and the thermal infrared images respectively, wherein the image scale factor $\sigma_{Scalefactor}$ is a ratio of a distance between the two adjacent calibration points in visible light images and a distance between the two adjacent calibration points in thermal infrared images;

$$\sigma_{Scalefactor} = \frac{X_{infrared}^n - X_{infrared}^{n-1}}{X_{visible}^n - X_{visible}^{n-1}},$$

wherein n is a number of checkerboard calibration points; $X_{infrared}^n$ is a coordinate value of the pixel coordinate system of an n-th calibration point in the thermal infrared camera; $X_{visible}^n$ is a coordinate value of the pixel coordinate system of the n-th calibration point in the visible light camera;

offset vectors $x_{shift}$, $y_{shift}$ are obtained by subtracting a column vector of the same calibration point in the visible light pixel coordinate system from a column vector in the thermal infrared pixel coordinate system of a same calibration point:

$$\begin{bmatrix}x_{shift}\\y_{shift}\end{bmatrix}=\begin{bmatrix}x_{visible}^n\\y_{visible}^n\end{bmatrix}-\begin{bmatrix}x_{infrared}^n\\y_{infrared}^n\end{bmatrix},$$

step 4, down-sampling the visible light images, unifying image parameters and field of view of the thermal infrared images and the visible light images: unifying resolution of the images, unifying the imaging ranges to be thermal infrared image imaging ranges and unifying spatial scale to be scale parameters of the thermal infrared images, and taking the thermal infrared images as interest areas or target areas, and according to a solved image scale factor $\sigma_{Scalefactor}$ and offset vector $$\begin{bmatrix}x_{shift}\\y_{shift}\end{bmatrix},$$

correcting and matching the visible light images, and reserving the interest areas or the target areas; multiplying a visible light image V(x, y) by the image scale factor, and scaling to a spatial scale L(u, v) of the thermal infrared images, and realizing a spatial information registration of the thermal infrared images and the visible light images by combining the offset vector:

$$L(u,v)=V(x,y)*\sigma_{Scalefactor};$$

step 5, performing a convolution calculation on down-sampled visible light images by using an edge detection operator, and performing an edge detection on the down-sampled visible light images, so as to extracting edge skeleton maps of the visible light images and performing binarization as an edge feature detail matrix; and step 6, adopting a pixel-level fusion method, converting the thermal infrared images into a form of numerical matrix by using an image processing function, and adding the numerical matrix of the thermal infrared images and an edge feature binary image matrix to improve a number of feature points and recognition capability of the thermal infrared images.

2. The method according to claim 1, wherein the ten-lens imaging unit comprises five visible light lenses with same specifications and five thermal infrared lenses with same specifications.

3. The method according to claim 2, wherein the visible light lenses are RGB color cameras and the thermal infrared lenses are uncooled medium-wave infrared cameras.

4. The method according to claim 3, wherein the five lens groups are arranged adjacent to each other at the center position and the four corner positions of the unmanned aerial vehicle, and adjacent visible light lenses and the thermal infrared lenses are arranged in a parallel optical axis structure with a same inclination direction and imaging visual angles.

5. The method according to claim 4, wherein the method is built into the airborne computing unit as the image processing module, and received thermal infrared images and visible light images in the same time domain and space domain are processed and fused in real time.

6. The method according to claim 5, wherein in the step 2, monocular calibration is performed on the visible light lens and the thermal infrared lens to obtain the internal parameter matrix K and the transformation matrix C between the camera coordinate system and the world coordinate system.

* * * * *